May 26, 1964   A. P. JENTOFT   3,134,290
CORROSION RESISTANT METAL SCREW WITH A PLASTIC HEAD
Filed Aug. 23, 1962   2 Sheets-Sheet 1
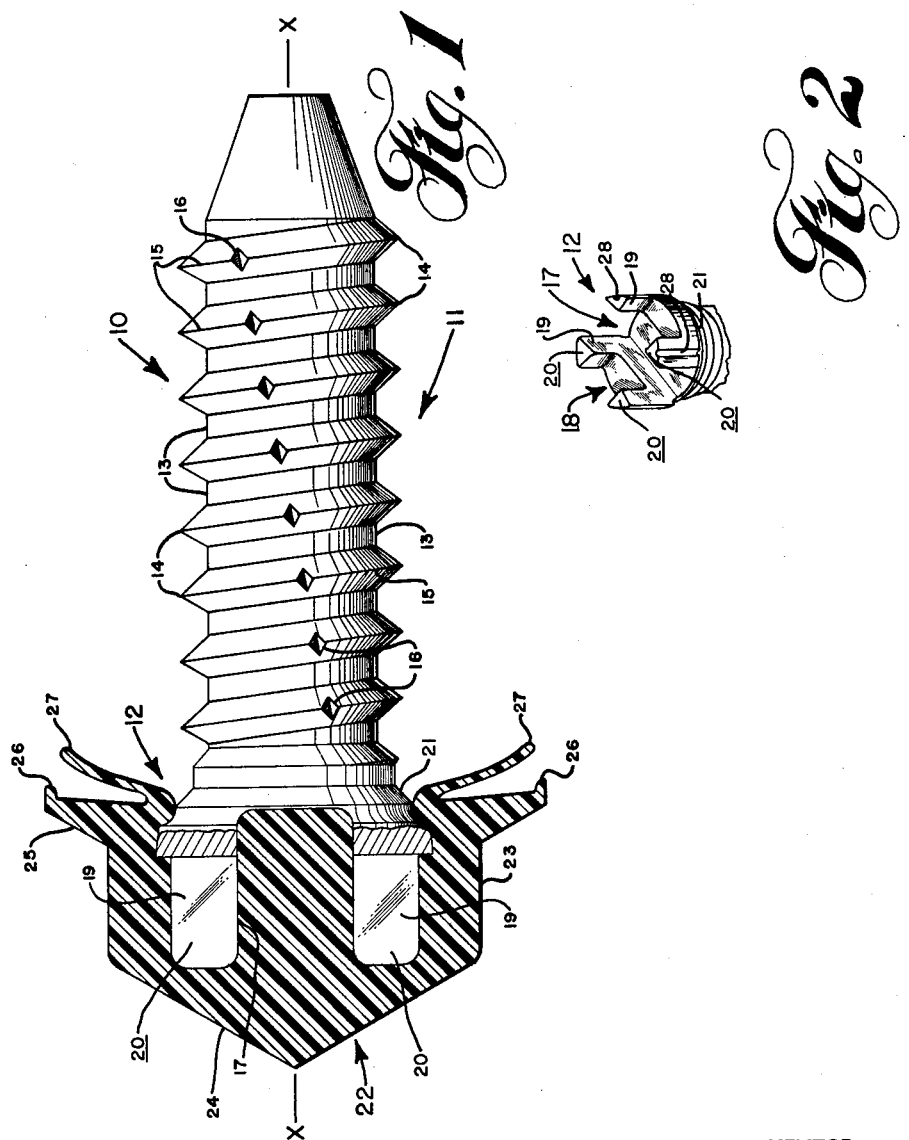
INVENTOR.
ARTHUR P. JENTOFT
BY
AGENT INVENTOR.
ARTHUR P. JENTOFT
BY
*George E. Manias*
AGENT

United States Patent Office 3,134,290
Patented May 26, 1964

3,134,290
CORROSION RESISTANT METAL SCREW WITH A PLASTIC HEAD
Arthur P. Jentoft, Wexford, Pa., assignor to H. H. Robertson Company, Pittsburgh, Pa., a corporation of Pennsylvania
Filed Aug. 23, 1962, Ser. No. 218,921
13 Claims. (Cl. 85—9)

The present invention relates to a corrosion resistant metal threaded fastener and, more particularly, to a metal screw having a plastic head through which the necessary torque for driving the screw can be applied.

This application is a continuation-in-part of my copending applications Serial Number 837,200, filed August 31, 1959; and Serial Number 10,158, filed February 23, 1960; both now abandoned.

Weather resistant threaded fasteners, or screws, frequently are employed in the fabrication of items for outdoor use such as roof ventilators; such fasteners are used in assembling building panels and for securing building panels into a structural framework. For these applications, the threaded fasteners usually possess self-tapping features.

The screw-head is exposed to all varities of weather conditions which makes corrosion resistant properties desirable in such fasteners. Many corrosion resistant fasteners have been developed which require special tools for securing them. Many expensive corrosion resistant fasteners are available. For example, stainless steel screws have gained wide acceptance in commerce because of their corrosion resistant properties and ease of fastening with conventional tools. Where colored or tinted building panels are employed, the screw-heads of stainless steel screws tend to disrupt the aesthetic appearance of a building wall. While paints and pigments have been applied to the stainless steel screw-heads, the problem of color matching such paints has presented problems. Moreover the color changes resulting from weathering will differ between the paint and the colored or tinted building panels so that a disruption in the aesthetic appearance of a building wall is evident after weathering.

Not all of the stainless steels can be fabricated into cold-headed fasteners. Of those stainless steels which can be used, the one possessing best resistance to corrosion (Type 305) has proved totally unacceptable in its resistance to corrosion when exposed to coastal atmospheres.

Presently available fasteners require leakage protection in the form of washers or grommets which usually are designed on an ad hoc basis to correspond to the particular fastener. These washers or grommets are placed on each fastener individually by a time-consuming manual operation.

According to the present invention I have provided a metal screw body to which a plastic screw-head is affixed. The plastic screw-head preferably has an equilateral geometrical cross-section adapted to standard wrenches. I have found that surprisingly the plastic screw-head will withstand without distortion sufficient torque necessary for the threaded metal shaft to tap its own thread into a screw hole drilled through one-half inch steel plate. The metal body of the screw had a threaded portion at one end and an integral head portion of greater diameter at the other end. The head portion has a plurality of slots extending radially from the longitudinal axis of the metal body which define aliquot sectors in the head. Longitudinal grooves can be provided in the periphery of each aliquot sector of the head portion. The plastic screw-head is injection molded onto the body so that the plastic material fills the slots of the head portion with an integral mass of high impact resistant, thermoplastic material having a high modulus of elasticity and good weathering properties. The plastic material also will fill the peripheral longitudinal grooves, if provided.

Preferably the plastic screw-head has a radial flange extending in the direction of the threaded end portion of the metal body and presenting a shaftwardly concave surface. The plastic screw-head also may have, in addition to the radial flange, a shaftwardly concave skirt which extends in its relaxed position over the metal shaft. Such concave skirts provide a sealing means for the fastener which performs the function of the independent washers or grommets of existing fasteners.

The plastic material forming the head of the fastener should possess high impact resistance along with a high modulus of elasticity. Thermoplastic materials permit rapid molding of the fastener head. Preferred plastic materials include polyamide, polycarbonate and polymethylene resins which are available under the names nylon, Flexan and Delrin. Other suitable materials include cellulose acetate butyrate and glass fiber reinforced polystyrene.

The principal object of this invention is to provide a fastener having a metal threaded shaft and a plastic head capable of withstanding without distortion the severe torque required for the fastener to tap its own threads into steel plate.

A further object of this invention is to provide a weather resistant head for steel screws having any desired hue.

A still further object of this invention is to provide a plastic headed screw which will provide, without independent washers or grommets, a weathertight seal between the screw-head periphery and the outer surface into which the screw shaft is threaded. Other objects and advantages of the present invention will be apparent from the following detailed description by reference to the accompanying drawings in which:

FIGURE 1 is an illustration, partly in cross-section, of one embodiment of a plastic headed screw according to the present invention;

FIGURE 2 is a perspective illustration of the slotted head portion of the metal screw shaft of FIGURE 1;

Figure 3:
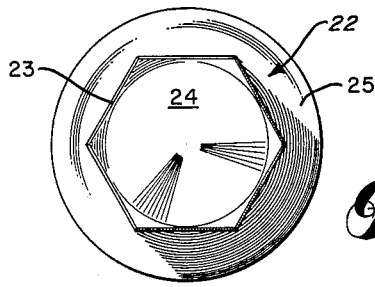
FIGURE 3 is an elevation of the outward surfaces of the plastic head of FIGURES 1 and 4.

Referring to FIGURES 1, 2 and 3, I provide a metal body 10 having a threaded shaft end portion 11 and an unthreaded head portion 12. The threaded shaft end portion 11 has a helical groove providing thread roots 13 and thread crests 14. The thread crest line 15 forms a helical spiral. To improve the metal cutting properties of the threaded portion 11, a notch 16 may be provided in each crest 14 along a plurality of straight lines which are substantially perpendicular to thread crest line 15. Any desired thread may be applied to the threaded shaft end portion 11.

The head portion 12 is integral with the threaded shaft end portion 11 and shares a common longitudinal axis X—X therewith. The head portion 12 is substantially cylindrical, having a diameter which is greater than that of the thread crests 14. Extending radially outwardly from the longitudinal axis X—X in the head portion 12 are a plurality of slots 17 and 18. Each slot 17 and 18 forms two inner faces 19 of prongs 20, each having a circular sector cross-section. Preferably the slots 17 and 18 are equiangularly disposed so that the resulting prongs 20 form aliquot sectors of the head portion 12. Longitudinal grooves 28 may be provided along the periphery of the head portion 12 to receive plastic material.

I prefer that the slots 17 extend into the head portion 12 to a greater depth than the slots 18. By providing slots of varying depth, the resulting fastener is able to withstand greater torque stresses.

A frusto-conical shoulder 21 is provided between the head portion 12 and the threaded shaft end portion 11 of the metal body 10. The shoulder 21 serves as a sealing surface against an injection die during an injection molding operation which affixes a plastic screw-head to the body 10 as will be hereinafter described.

I prefer to form the head portion 12 by a cold heading operation which concurrently enlarges the diameter of the shaft of the metal body 10 beyond that of the thread crests 14 and also forms the slots 17 and 18. Such cold heading operations have been successfully performed on metal bodies formed from carbon steel and stainless steel. The metal body 10 may be formed from any suitable metal such as carbon steel, alloy steel, aluminum, aluminum alloys, brass and the like. It is a feature of the present invention that a corrosion resistant fastener can be obtained from ordinary carbon steel without requiring the more expensive stainless alloys.

A screw-head 22 is affixed to the head portion 12 by an injection molding operation. The screw-head 22 is formed from thermoplastic materials having high impact resistance and a high modulus of elasticity. The screw-head 22 comprises a unitary mass of suitable thermoplastic material which surrounds the prongs 20 and fills the slots 17 and 18. Over a substantial central portion 23 of the screw-head 22, the cross section has an equilateral geometrical configuration, preferably hexagonal to permit engagement of the screw-head with a standard wrench. The outboard end 24 of the screw-head can assume any aesthetically pleasing configuration, for example, a conical configuration as shown in FIGURES 1 and 3.

Where a weatherproof, corrosion-resistant fastener is desired, a radial flange 25 is provided on the inboard end of the screw-head 22. The radial flange 25 preferably has a conical outer surface and presents a less acute conical inner surface toward the threaded shaft 11. A peripheral lip 26 may be provided in a shaftward direction from the rim of the radial flange 25.

A conical skirt 27, integral with the screw-head 22, also may be provided between the radial flange 25 and the threaded shaft 11. In FIGURE 1, the conical skirt 27 is shown in its relaxed position as being spaced from the radial flange 25 in a shaftward direction. The conical skirt 27 has greater convexity toward the shaft 11 than the inner surface of the radial flange 25. The conical skirt 27 may have a sectionally curved surface. The rim of the conical skirt 27 extends, in its relaxed position, beyond the inboard end of the shoulder 21. The function of the conical skirt 27 is to provide a primary sealing means which takes the place of the conventional washers or grommets.

As the fastener is twisted into a drilled hole, the conical skirt 27 flattens against the outer surface of the material through which the fastener is secured and forms a weathertight seal with the material surface. The conical skirt 27 obviates the need for gaskets or grommets for use in combination with the fastener. The conical skirt 27 is formed from the same injection-molding operation which affixes the screw-head 22 onto the metal body 10.

The injection-molding operation whereby the screw-head 22 is affixed to the metal body 10 is conveniently carried out in a conventional split housing die having a central aperture for receiving the metal body. The aperture is tapered to receive the shoulder 21. A quantity of thermoplastic material is injected into the die, and, after setting, the die is opened and the headed fastener removed.

A further feature of the present invention permits rapid removal of the fasteners in the event of destruction of the plastic heads. When the plastic head of the fastener is removed, the slots 17 and 18 are externally presented and can receive a screwdriver tip to permit removal of the metal body 10 from a screw hole.

Another feature of the present invention assures holding of the fastener in the event of destruction of the plastic head. Because the head portion 12 is of greater diameter than the threaded shaft, the enlarged metal head portion itself serves as a fastening means. If a fire should occur in an assembly employing the present fasteners, the melting or destruction of the plastic head would not result in a failure of the fastener.

A typical fastener made according to the present invention had a thread diameter of $7/32''$. A polyamide resin screw head having a hexagonal cross-section, $3/8''$ from flat surface to flat surface was affixed. These fasteners have been driven through $3/16''$ drilled holes in one-half inch thick metal plate. No distortion of the screw head was evident. An applied torque of 100 inch-pounds was employed to drive the fasteners.

Figure 4:
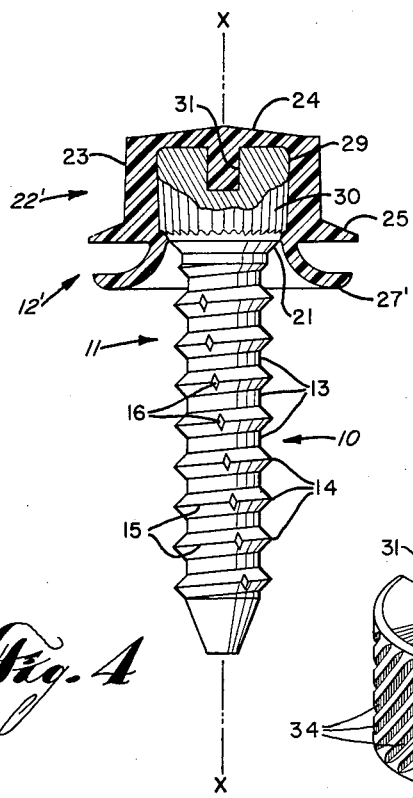
FIGURE 4 is an illustration, partly in cross-section, of an alternative embodiment of a plastic headed screw according to the present invention.
Figure 5:
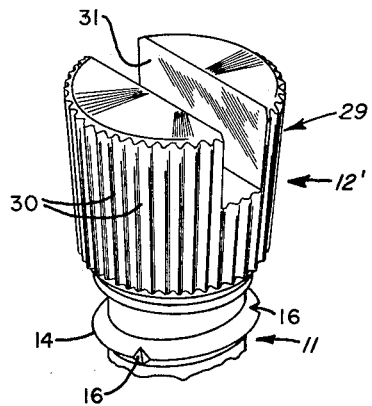
FIGURE 5 is a perspective view of the slotted head portion of the metal screw shaft of FIGURE 4.

An alternative embodiment of the present corrosion resistant metal screw is illustrated in FIGURES 4 and 5. Corresponding numerals are employed to identify corresponding parts heretofore described.

In this embodiment, the metal body 10 has a threaded shaft end 11 and an unthreaded head portion 12'. The head portion 12' is integral with the threaded shaft end portion 11 and shares the common longitudinal axis X—X. The head portion 12' is substantially a conical frustum having a major and minor diameter, both of which are greater than that of the thread crests 14. The sloping walls 29 have a plurality of longitudinal grooves 30. A single diametrical slot 31 is provided through the longitudinal axis X—X and through the major diameter of the head portion 12'. The slot 31 extends into the head portion 12' substantially to its central portion.

The head portion 12' preferably is formed by a cold heading operation which enlarges the diameter of the shaft of the metal body 10. Thereafter the peripheral grooves 30 are formed by rolling or shearing the head portion 12. The slot 31 then is cut into the head portion 12' and the threads are cut into the shaft end portion 11.

A screw-head 22', similar to the screw-head 22 of FIGURES 1 and 3, is affixed to the head portion 12' by an injection molding operation. The screw-head 22' is formed from thermoplastic materials having high impact resistance and a high modulus of elasticity. The screw-head 22' comprises a unitary mass of suitable thermoplastic material which surrounds the head portion 12' and fills the peripheral grooves 30 and the slot 31. Over the substantial central portion 23 of the screw-head 22', the cross-section has an equilateral geometric configuration, preferably hexagonal to permit engagement of the screw-head 22' with a standard wrench. The outboard surface 24 of the screw-head 22' can assume any aesthetically pleasing configuration, for example, the conical configuration as shown in FIGURES 3 and 4.

The screw-head 22' may be provided with a skirt 27', integral therewith, which is positioned between the radial flange 25 and the threaded shaft 11. The skirt 27' is shown, in FIGURE 4, in its relaxed position as being spaced from the radial flange 25 in a shaftward direction.

In a specific embodiment of a fastener of this embodiment, a carbon steel body is one-inch long with 14 threads per inch at a thread angle of 60°. The head portion has a major diameter of 0.32 inch and a minor diameter of 0.30 inch. The head portion is 0.192 inch in length. The mean thickness of the threaded shaft is 0.22 inch. Thirty-six longitudinal grooves are provided over the periphery of the frusto-conical head portion.

Suitable plastic heads have been made in the following colors: red, yellow, blue, green, orange, gray and black.

The described fastener was driven into a $3/16$-inch diameter hole drilled through a one-half inch steel plate without distortion of the plastic head. The fastener withstood applied torsion of 100-inch pounds without distortion. More severe torsional stresses resulted in slippage of the hex-head socket wrench around the plastic head whereby the corners of the plastic head were rounded. The plastic did not slip with respect to the metal body.

Figure 6:
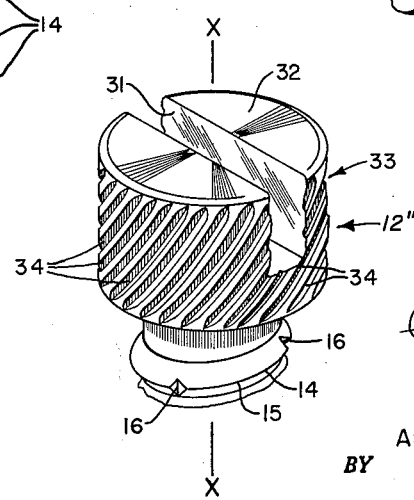
FIGURE 6 is a perspective view of an alternative embodiment of the slotted head portion of FIGURE 5.

A further alternative embodiment of the head portion of the present metal screw is illustrated in FIGURE 6. Corresponding numerals are employed to identify corresponding parts heretofore described.

In this embodiment, the shaft end portion 11 is provided with a generally cylindrical unthreaded head portion 12″ having an upper face 32 and side walls 33. The single diametrical slot 31 is provided through the longitudinal axis X—X and through the upper face 32 thereof. The side walls 33 of the head portion 12″ are provided with a plurality of oblique peripheral grooves 34. The peripheral grooves 34 are oriented obliquely with respect to the longitudinal axis X—X. The peripheral grooves 34 preferably are helical grooves which spiral shaftwardly toward the threaded shaft 11 and in the same direction as the helical crest line 15 of the thread crest 14. The plurality of oblique grooves and the single diametrical slot 31 assure that the screw-head 22 (22′) will hold under normal self-tapping stresses.

I claim:

1. A corrosion resistant screw comprising a metal body with a threaded shaft and an integral head portion of greater diameter than said shaft, said head portion having a plurality of slots extending radially from the longitudinal axis of said metal body, said slots defining aliquot sector prongs in said head portion, a screw-head comprised of impact-resistant, high modulus of elasticity, thermoplastic material surrounding said head portion and filling said slots as a unitary mass, said screw-head being of peripheral equilateral geometric configuration in its central portion in the region of said prongs, a radial flange integral with said screw-head adjacent to said threaded shaft, and a shaftwardly concave skirt of said unitary mass between said radial flange and said shaft.

2. The screw of claim 1 in which said thermoplastic material is a polyamide resin.

3. The screw of claim 1 in which said thermoplastic material is a polycarbonate resin.

4. The screw of claim 1 in which said thermoplastic material is a polymethylene resin.

5. The screw of claim 1 in which said thermoplastic material is cellulose acetate butyrate.

6. The screw of claim 1 in which said thermoplastic material is polystyrene filled with glass fibers.

7. The screw of claim 1 in which longitudinal grooves are provided in the periphery of said prongs to receive said thermoplastic material from said unitary mass.

8. The screw of claim 1 wherein the said shaftwardly concave skirt has a rim which extends, in relaxed condition, in a shaftward direction beyond the initial threaded portion of said threaded shaft.

9. The screw of claim 1 wherein the said radial flange has a shaftwardly extending lip of greater diameter than said skirt.

10. The screw of claim 1 wherein the said threaded shaft has a self-tapping thread.

11. A corrosion resistant screw comprising a metal body with a threaded shaft and an integral head portion of greater diameter than said threaded shaft, said head portion having a plurality of longitudinal peripheral grooves in its side walls thereof and a single diametrical slot extending transversely through the longitudinal axis of said metal body, a screw-head comprised of impact resistant, high modulus of elasticity thermoplastic material surrounding the said head portion and filling the said single diametrical slot and the said peripheral grooves as a unitary mass, said screw-head being of peripheral equilateral geometric configuration in its central portion and having a radial flange adjacent to the said threaded shaft, said screw-head further having a shaftwardly extending flared skirt integral therewith and disposed between the said radial flange and the said threaded shaft, said skirt being in its relaxed position spaced from the said radial flange in a shaftward direction.

12. A corrosion resistant screw comprising a metal body with a threaded shaft and an integral head portion of greater diameter than said threaded shaft, said head portion including side walls and an upper face, said side walls having a plurality of peripheral helical grooves therein, said head portion having a single diametrical slot extending transversely through the longitudinal axis of said metal body and through the said upper face, a screw-head comprised of impact resistant, high modulus of elasticity thermoplastic material surrounding the said head portion and filling the said single diametrical slot, and the said peripheral grooves as a unitary mass, said screw-head being of peripheral equilateral geometric configuration in its central portion and having a radial flange adjacent to the said threaded shaft, said screw-head further having a shaftwardly extending flared skirt integral therewith and disposed between the said radial flange and the said threaded shaft, said skirt being in its relaxed position spaced from the said radial flange in a shaftward direction.

13. The corrosion resistant screw of claim 12 wherein said helical grooves spiral shaftwardly toward said threaded shaft and in the same direction as the threads of said threaded shaft.

References Cited in the file of this patent

UNITED STATES PATENTS

| | | |
|---|---|---|
| 2,272,552 | Field | Feb. 10, 1942 |
| 2,850,064 | Rapata | Sept. 2, 1958 |